United States Patent

Bauzhis et al.

[15] 3,689,860

[45] Sept. 5, 1972

[54] COLOR PICTURE TUBES

[72] Inventors: Albertas Vatslovovich Bauzhis, ulitsa Mintes, 34-50; Petras-Kestutis Petrovich Damienaitis, ulitsa Venuolio, 6, kv. 32; Sauljus Bonoventuro Zhlabis, ulitsa Charno, 53, kv. 29; Petras-Alvidas Petro Shilenas, ulitsa Zhirmunu, 29, kv. 102, all of Vilnjus, U.S.S.R.

[22] Filed: Nov. 9, 1971

[21] Appl. No.: 196,887

[52] U.S. Cl.....................................335/210, 335/213

[51] Int. Cl.................................................H01f 7/00

[58] Field of Search.................335/210, 213; 313/77

[56] References Cited

UNITED STATES PATENTS 2,414,925 1/1947 Buckbee................335/213 X

*Primary Examiner*—George Harris

*Attorney*—Eric H. Waters et al.

[57] ABSTRACT

A color picture tube, comprising a deflection system with two pairs of coils placed on the inner surface of a ferrite core and a dynamic beam convergence system made in the form of at least two additional coils wound on the diametrically opposite ends of said ferrite core and having a common plane of symmetry with one of the pairs of coils in the deflection system.

1 Claim, 2 Drawing Figures

COLOR PICTURE TUBES

The present invention relates to television engineering, and more specifically to color picture tubes with electron guns located all in the same plane.

Known in the prior art is a color picture tube comprising a deflection system with two pairs of coils located on the inner surface of a ferrite core, producing the scanning pattern on the picture-tube face.

To accomplish dynamic beam convergence, the deflection system is followed by a dynamic beam convergence system which, together with the pole-pieces of the picture tube, produces a magnetic convergence field for each electron beam separately.

Since in this prior-art picture tube the deflection system and the dynamic convergence system are made in the form of two separate assemblies, the center of beam deflection and the center of beam convergence are not coincident, and this impairs the color purity of each dot pattern. It is impossible to fully counteract the effect of dynamic beam convergence on color purity at the design stage, because the angle of convergence is different for different picture tubes and deflection systems.

It is the object of the present invention to provide a color picture tube in which the deflection system and the dynamic beam convergence system make up a single assembly, so that the center of deflection and the center of dynamic beam convergence are coincident and, in the final analysis, the color purity of each dot pattern separately is improved.

With this object in view, the present invention resides in that in a color picture tube according to the invention the dynamic beam convergence system uses at least two pairs of additional coils wound on the diametrically opposite ends of the ferrite core in the deflection system and having a common plane of symmetry with one of the pairs of coils of the deflection system.

Figure 1:
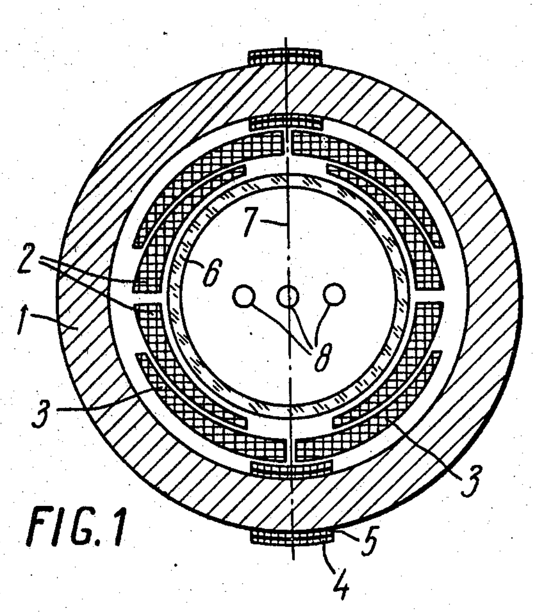
Figure 2:
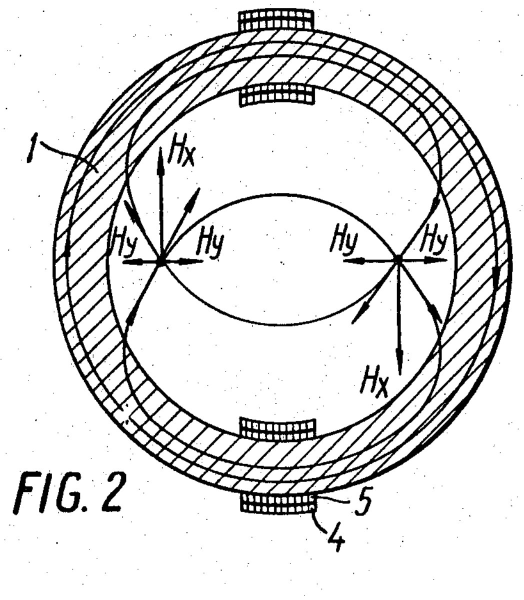

The invention will be more fully understood from the following description of a preferred embodiment when read in connection with the accompanying drawings, wherein:

FIG. I shows a cross-section through a color picture tube according to the invention;

FIG. 2 shows a map of the magnetic field produced by the additional coils according to the invention.

Referring to FIG. I, there is a picture tube which comprises a toroidal ferrite core I on the inner surface of which are placed two horizontal deflection coils 2 and two vertical deflection coils 3, while on each of the diametrically opposite ends of the core I are wound two additional dynamic beam convergence coils 4, 5. The ferrite core I and the coils 2, 3, 4, and 5 are put on the neck 6 of the picture tube. The additional coils 4, 5 are wound so that they have a common plane 7 of symmetry with the vertical deflection coils 3. Electron guns 8 in this embodiment are placed in a common plane normal to the plane 7 of symmetry which passes through the central gun 8.

The magnetic field produced by the additional coils, whose map is shown in FIG. 2, has only $H_x$ components due to the coils 4 and 5, arranged in parallel with the plane 7 of symmetry, but directed in opposite directions, while the $H_y$ components of both coils 4 and 5 cancel out.

At the initial instant of deflection, the two non-central beam are in different halves of the neck 6 of the picture tube relative to the plane 7 of symmetry, and the magnetic field due to the additional dynamic-convergence coils 4 and 5 acts upon these beams in opposite directions. By appropriately directing the currents in the additional coils 4 and 5 and by varying the magnitude of these currents in synchronism with variations in the currents flowing in the horizontal and vertical deflection coils 2 and 3, it is possible to converge the beams in a direction normal to the plane 7 of symmetry.

Beam convergence in a direction parallel with the plane 7 of symmetry can be obtained by the choice of the parameters of the deflection coils 2 and 3.

In a picture tube made substantially as described herein, the center of deflection of the deflecting coils can be made practically coincident with the center of convergence of the additional dynamic-convergence coils and the effect of dynamic convergence on the color purity of each color-dot pattern can be eliminated. In the preferred embodiment of a color picture tube according to the invention, the deflection system and the dynamic-convergence system make up a single assembly, which also constitutes an advantage of the present invention.

The picture tube disclosed herein may also have its electron guns arranged in a triangle, but in such a case the three beams cannot fully be converged, and in order to converge the electron gun located in the plane of symmetry one has to use ordinary dynamic-convergence coils and a magnetic pole-piece in the picture tube.

What is claimed is:

1. A color picture tube comprising: a deflection system with two pairs of deflection coils placed on the inner surface of a ferrite core; a dynamic beam convergence system which is made in the form of at least two pairs of additional coils wound on the diametrically opposite ends of said ferrite core and having a common plane of symmetry with one of the pairs of coils in said deflection system.

* * * * *